(12) United States Patent
Lantaigne

(10) Patent No.: US 7,070,220 B1
(45) Date of Patent: Jul. 4, 2006

(54) TRUCK BED EXTENSION/RAMP

(76) Inventor: Raymond Lantaigne, 237 Hessle Street, Box 1303, New-Liskeard, ON POJ 1P0 (CA)

(*) Notice: Subject to any disclaimer, the term of this patent is extended or adjusted under 35 U.S.C. 154(b) by 0 days.

(21) Appl. No.: 11/100,417

(22) Filed: Apr. 7, 2005

(51) Int. Cl.
*B60R 9/06* (2006.01)

(52) U.S. Cl. .............. 296/26.08; 296/26.1; 296/26.11; 296/61; 14/69.5

(58) Field of Classification Search ............ 296/26.08, 296/26.09, 26.1, 26.11, 61, 57.1; 14/71.1, 14/69.5; 414/537; 224/499, 518, 519, 521, 224/504–506
See application file for complete search history.

(56) References Cited

U.S. PATENT DOCUMENTS

| | | | |
|---|---|---|---|
| 4,735,454 A | | 4/1988 | Bernard |
| 5,033,662 A | * | 7/1991 | Godin ..................... 224/521 |
| 5,156,432 A | * | 10/1992 | McCleary ................. 296/61 |
| 5,816,638 A | * | 10/1998 | Pool, III ................ 296/26.11 |
| 5,997,066 A | | 12/1999 | Scott |
| 6,076,215 A | * | 6/2000 | Blankenship et al. ........ 14/71.1 |
| 6,227,593 B1 | | 5/2001 | De Valcourt |
| 6,296,290 B1 | * | 10/2001 | Wolf ........................ 296/61 |
| 6,379,101 B1 | * | 4/2002 | Breaux ..................... 414/537 |
| 6,447,040 B1 | | 9/2002 | Young, Sr. |
| 6,502,730 B1 | * | 1/2003 | Johnson ................... 224/519 |
| 6,513,690 B1 | * | 2/2003 | Churchill et al. ........... 224/498 |
| 6,533,337 B1 | * | 3/2003 | Harshman et al. ....... 296/26.08 |
| 6,616,208 B1 | | 9/2003 | Bauer |
| 6,712,248 B1 | * | 3/2004 | Mitchell ................... 224/499 |
| 6,769,583 B1 | * | 8/2004 | Gordon et al. ............. 224/506 |
| 2002/0172584 A1 | * | 11/2002 | Huggins .................... 414/537 |
| 2004/0160079 A1 | * | 8/2004 | Harper et al. ................ 296/61 |

* cited by examiner

*Primary Examiner*—D. Glenn Dayoan
*Assistant Examiner*—Greg Blankenship
(74) *Attorney, Agent, or Firm*—Greenblum & Bernstein, P.L.C.

(57) ABSTRACT

A combination bed extension/ramp structure for attachment to a sleeve-hitch of a truck, the structure comprising a non-revolving-hitch attachment member; a rear rectangular panel pivotally connected to the non-revolving-hitch attachment member to pivot around a first substantially horizontal axis from a first substantially upright position to a second position, wherein the rear panel is acting as a ramp between a rear panel-ground contact point and the plane of the non-revolving-hitch attachment member; a front rectangular panel pivotally connected to the rear panel at an intermediate point whereby when the rear panel is in the first position, the front panel is positioned substantially horizontal; whereby when the rear panel pivots from the first position to the second position, the front panel pivots relative to the rear panel around a second substantially horizontal axis and moves from the horizontal position to an inclined position that complements the inclination of the rear panel in the second position.

8 Claims, 4 Drawing Sheets

TRUCK BED EXTENSION/RAMP

CROSS-REFERENCE TO RELATED APPLICATIONS

Not applicable

STATEMENT REGARDING FEDERALLY SPONSORED RESEARCH OR DEVELOPMENT

Not applicable.

REFERENCE TO A "SEQUENCE LISTING"

Not applicable.

FIELD OF INVENTION

The invention relates in general to the field of trucks and, in particular, it relates to a combination bed extension/ramp structure for attachment to a truck.

BACKGROUND OF THE INVENTION

The use of combination bed extensions/ramps is not new and considered to be well known in the art. However, in most contemporary systems (such as the ones described in U.S. Pat. No. 6,616,208, "Truck bed extension," and U.S. Pat. No. 6,227,593, "Truck bed extender/ramp," issued Sep. 9, 2003, to Bauer, and May 8, 2001, to De Valcourt, respectively), the bed extension is achieved by extending the tailgate horizontally outward from the truck bed and folding up a pair of ramps, which are adapted to fold up into an enclosure, to fit on top of the extended tailgate, while the ramp is achieved by attaching one end of each of the two ramps, in the unfolded position, to the edge of the horizontally extended tailgate that is farthest from the truck and resting the other of each ramp on the ground.

There are many problems associated with these systems:
1. When the system is functioning as a ramp, the tailgate of the truck extends horizontally; therefore, the inclination of the ramp is restricted to the horizontal distance between the tailgate-ramp contact point and the ground-ramp contact point.
2. The extended bed-to-ramp and ramp-to-extended bed conversions are not effortless: they require a considerable amount of effort and the use of various attachment means (such as tongues, straps, etc.)
3. The size of the extension of the truck bed is limited to the size of the tailgate of the truck on which the system is being used.
4. Different-size foldable ramps have to be used with different sizes of tailgates: one should marry the right size of foldable ramps to the right size of tailgate.
5. The ramp is a dual ramp, which limits the type of wheeled vehicles that can be loaded onto the truck. For example, these systems cannot be used to load a tricycle onto the truck.

The truck bed extension/ramp structure of the present invention provides a solution to these problems

SUMMARY OF THE INVENTION

To overcome the limitations of the prior art described above, the present invention accordingly provides a combination bed extension/ramp structure for attachment to a sleeve-hitch of a truck, the structure comprising a non-revolving-hitch attachment member; a rear rectangular panel pivotally connected to the non-revolving-hitch attachment member to pivot around a first substantially horizontal axis from a first substantially upright position to a second position, wherein the rear panel is acting as a ramp between a rear panel-ground contact point and the plane of the non-revolving-hitch attachment member; a front rectangular panel pivotally connected to the rear panel at an intermediate point whereby when the rear panel is in the first position, the front panel is positioned substantially horizontal; whereby when the rear panel pivots from the first position to the second position, the front panel pivots relative to the rear panel around a second substantially horizontal axis and moves from the horizontal position to an inclined position that complements the inclination of the rear panel in the second position.

The present invention provides the following advantages:
1. A less inclined ramp—a ramp not as steep.
2. Easy extended bed-to-ramp and ramp-to-extended bed conversions.
3. Easy installation: the structure is easily attached to the truck.
4. Universal structures: the same bed extension/ramp structure could be used on numerous trucks that belong to the same truck-size classification.
5. Capability of utilizing a towing ball to tow trailers when the structure is used as a bed extension.
6. Versatility with respect to the number of wheels of the vehicles being loaded and the sideway distance therebetween.

Other advantages will suggest themselves to those skilled in the art.

BRIEF DESCRIPTION OF THE DRAWINGS

The invention, its organization, construction and operation will be best understood by reference to the following detailed description taken into conjunction with the accompanying drawings, in which.

DETAILED DESCRIPTION OF THE PREFERRED EMBODIMENT

The following description shows only preferred embodiments of the present invention. Various modifications are apparent to those skilled in the art without departing from the scope of the present invention, which is only limited by the appended claims. Therefore, the embodiments shown and described are only illustrative, not restrictive.

Also, throughout the following description, specific details are set forth in order to provide a more thorough understanding of the invention; the invention, however, may be practiced without these particulars. In other instances, well-known elements have not been shown or described in detail to avoid unnecessarily obscuring of the invention.

It will be generally understood that in the present description and claims, the term "tail of the truck" (or "truck tail") may refer to the rear bumper of the truck or the rear end of the truck bed. Also, it will be generally understood that these terms—namely, "tail of the truck," "truck tail," "bumper," and "rear end of the truck bed"—as used in this document are interchangeable.

Though this invention is described with the pickup truck environment in mind, the truck bed extension/ramp structure described herein is applicable to a broad class of trucks and is not limited to pickup trucks.

Figure 1:
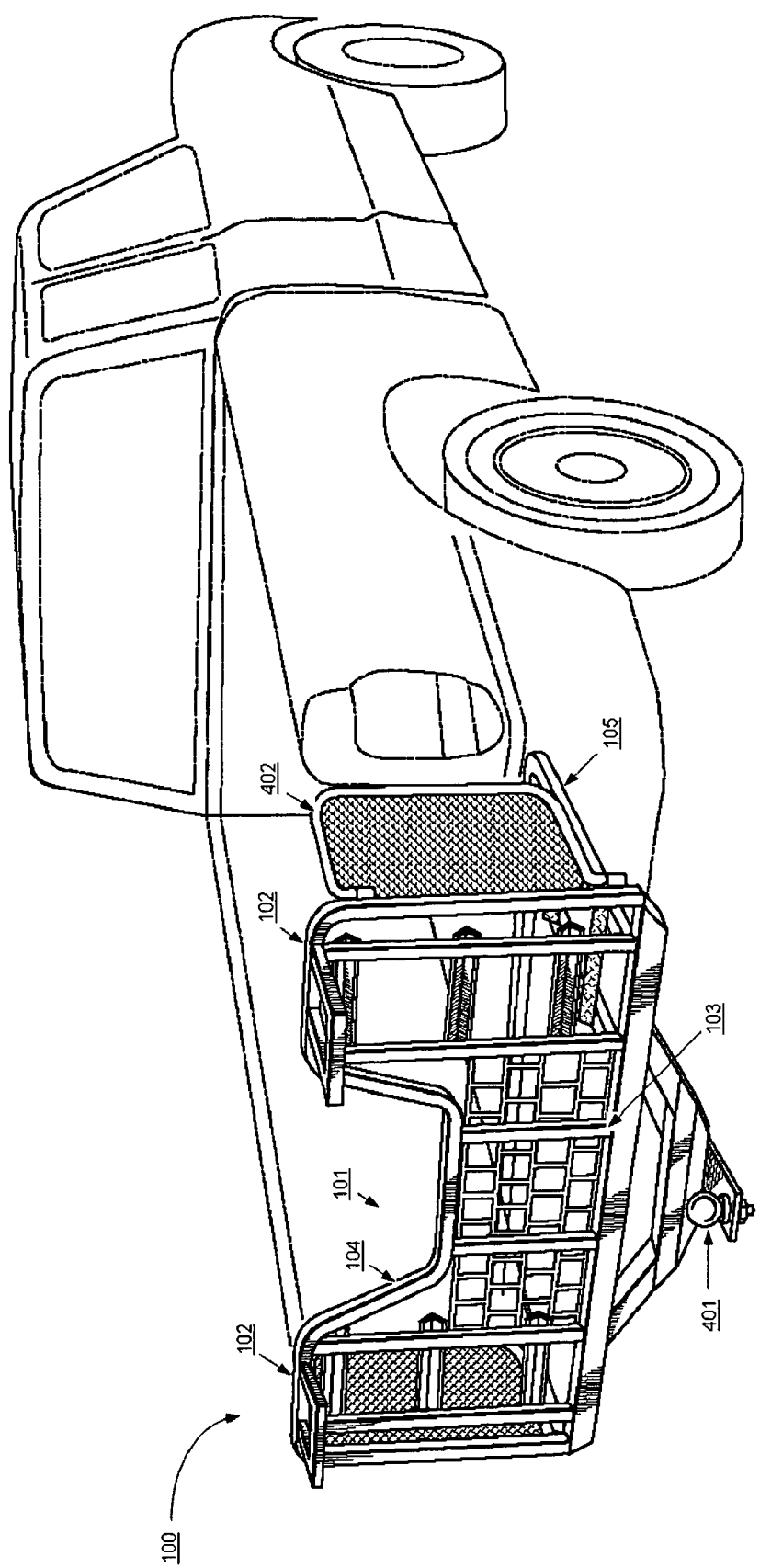
FIG. 1 is a perspective view of the present invention shown as a bed extension and illustrated as attached to a truck.

Referring to FIG. 1, there is illustrated in a perspective view, a combination bed extension/ramp structure (generally indicated by reference numeral 100) in accordance with the preferred embodiment of the present invention, shown as a bed extension. The structure includes a square-hitch attachment member (a.k.a. tongue) to allow the bed extension/ramp 100 to attach to the truck. The present invention is used with the tailgate of the truck removed.

Figure 2:
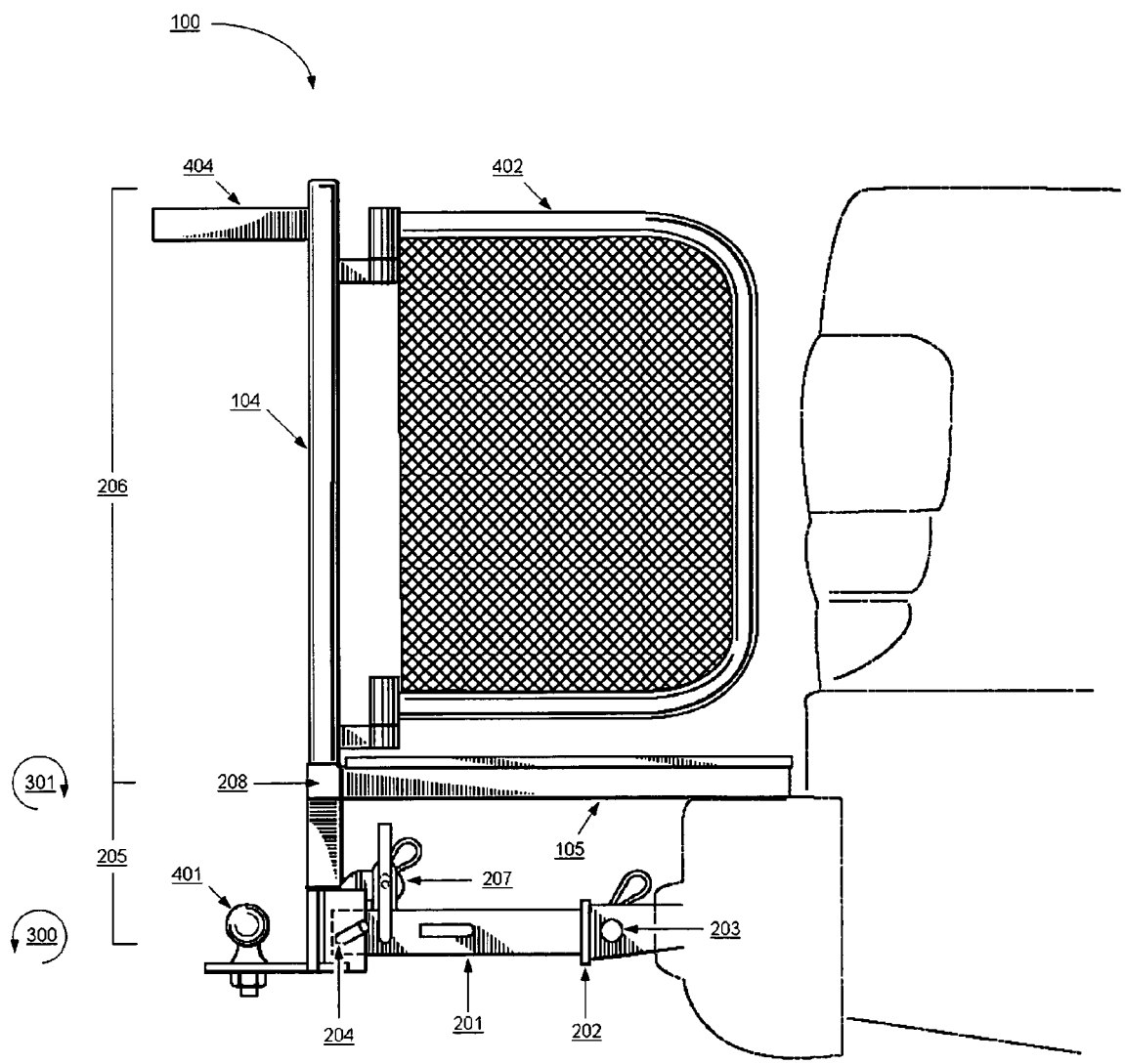
FIG. 2 is a side view of the present invention illustrating how the bed extension/ramp apparatus attaches to a truck.

FIG. 2 illustrates how the bed extension/ramp 100 attaches to the truck. The tongue 201 is inserted into the square hitch 202 and held in place by a conventional transverse hitch pin 203.

As can be readily apparent to those skilled in the art, the shape of the hitch and its counterpart—the tongue—does not have to be a square, but could be any shape that prevents the tongue from revolving inside the hitch causing the attached structure to rotate in the revolving direction with respect to the truck. For example, the shape could be triangular, rectangular, hexagonal, etc. Although, the hitch pin does prevent that kind of revolution once inserted, a non-revolving tongue 201 is preferred to facilitate the attachment of the bed extension/ramp 100 to the hitch 202, and particularly, to facilitate the insertion of the hitch pin 203.

A rear panel 104 is pivotally connected to the tongue 201. The rear panel 104 pivots around a horizontal axis 204 from a first substantially upright position, where the upper part 206 of the rear panel 104 is acting as a tailgate to the extended truck bed, to a second position (shown in FIG. 3), where the rear panel 104 is resting on the ground and acting as a ramp between the ground and hitch level. Locking means 207 are provided to lock the rear ramp in the upright position. The locking means illustrated 207 are the hole-and-pin lock type, but other locking means can be used.

Figure 3:
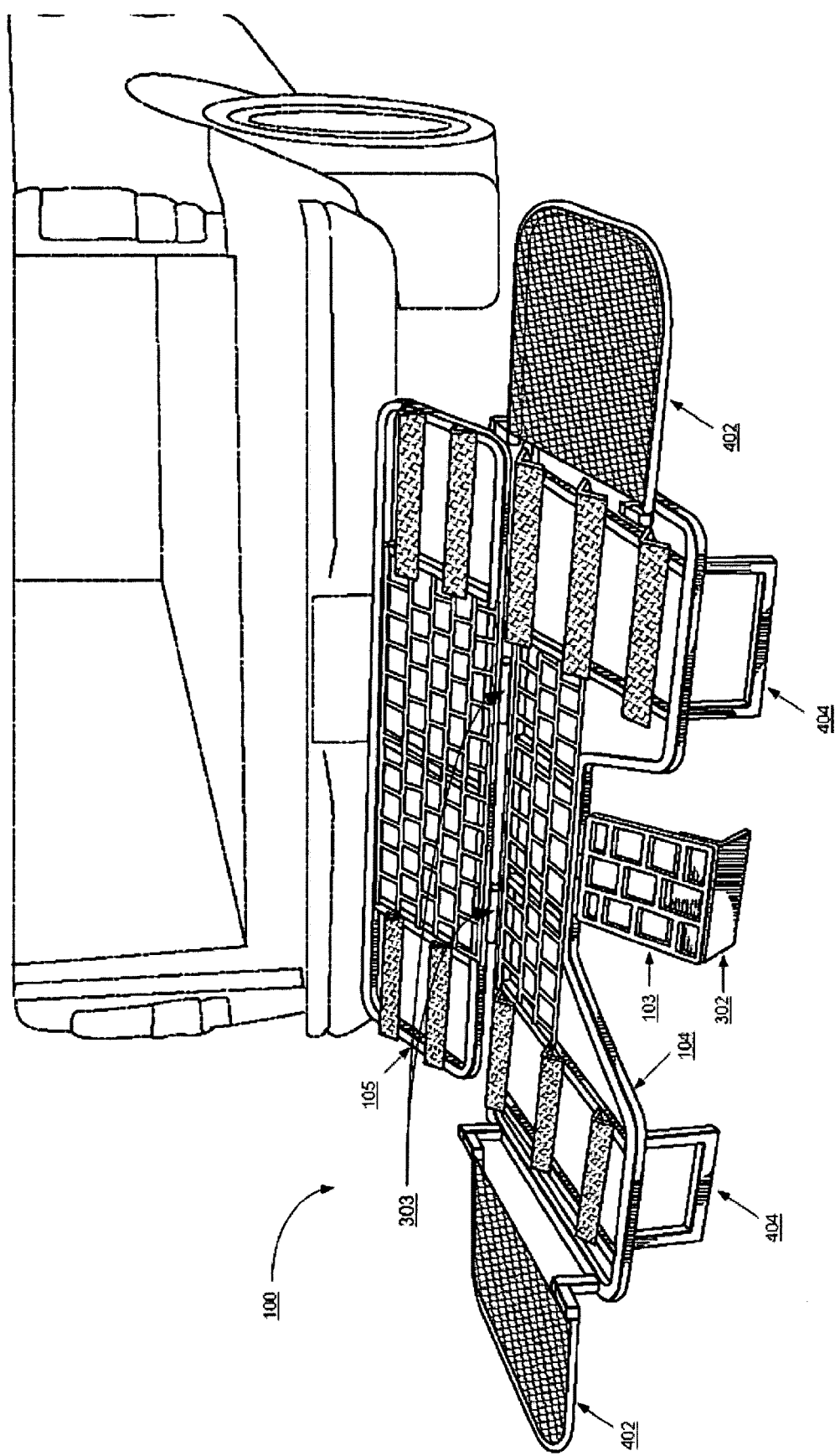
FIG. 3 is a perspective view of the present invention shown as a ramp and illustrated as attached to a truck.
Figure 4:
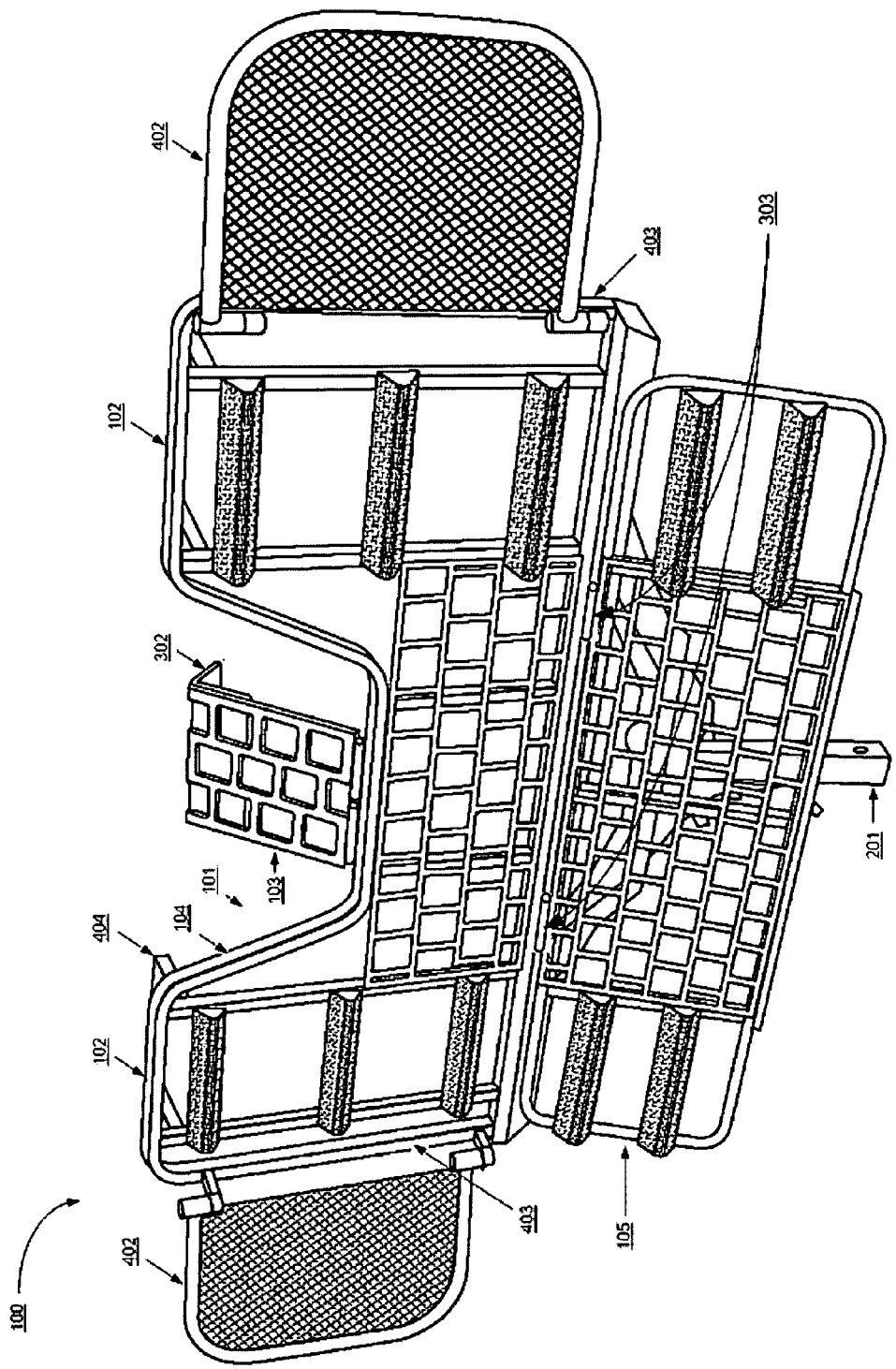
FIG. 4 is a perspective view of the present invention shown unattached to a truck.

A rectangular front panel 105 is pivotally connected to the rear panel 104 (as shown in FIGS. 3 and 4, 303) at point 208 where when the rear panel 104 is in its upright position, the front panel 105 would be in a horizontal position and resting on the tail of the truck. When the bed extension/ramp 100 is in this position (i.e., in the bed extension mode), the front panel 105 would be the extension to the truck bed.

FIG. 3 illustrates the bed extension/ramp 100 being used as a ramp. When the rear panel 104 pivots from its upright position to the position where it is resting on the ground (in the direction indicated by arrow 300), the front panel 105 pivots relative to the rear panel 104 in the direction indicated by arrow 301 and slides backward relative to the truck, moving from a horizontal position to an inclined position, forming a ramp, in combination with the rear panel 104.

In its inclined position, the front panel 105 could be resting on the portion of the rear panel 104 that would be below point 208 when the rear panel 104 is in its upright position (the "resting portion" is indicated by reference numeral 205). The resting portion 205 is adapted to receive the front panel 105 such that the inclination of the front panel 105 complements the inclination of the rear panel 104.

In another embodiment (not shown), the front panel 105 could still be resting on the tail of the truck (also in a way such that its inclination would complement the inclination of the rear panel 104), in which case the ramp will extend from the ground-ramp contact point to a ramp-truck tail contact point.

In the preferred embodiment, the rear panel 104 has a center cavity 101 in its top edge (when in the upright position) defining two side tongues 102. The two side tongues 102 form a twin ramp, when the bed extension/ramp 100 is in the ramp position (FIG. 3), to be utilized when loading wheeled vehicles onto the truck. In addition, the rear panel 104 has an auxiliary panel 103 pivotally attached to it at the center of the cavity. The auxiliary panel 103 could be pivotally opened (FIG. 3) to form a middle tongue, extending between the two side tongues 102, to be utilized when loading three-wheel vehicles onto the truck. The auxiliary panel 103 is adapted to have an inclination complementary to the inclination of the side tongues 102, when in use. This might or might not require the use of compensating means 302 when certain types of handles (discussed below) are used.

One important feature of the present invention is that it is used with the tailgate of the truck removed. Hence, the inclination of the ramp is in accordance with the ground-ramp contact point, which is illustrated by the handles 404 and the truck tail, instead of the ground-ramp contact point and the edge of a tailgate that is farthest from the truck when the tailgate is open/extended, resulting in a gentler—not as steep—inclination.

FIG. 4 shows the preferred embodiment 100 of the present invention unattached to a truck. A hitch-ball 401 can be attached to the rear panel 104 for towing trailers when the rear panel 104 is locked in the upright position. Also, side panels 402 are attached to the side edges 403 of the rear panel 104 to sufficiently enclose the extended bed when the bed extension/ramp 100 is in the bed extension mode.

The side panels 402 could be attached to the panel using any means (such as welding, knots and bolts, tongue-holes and pins, etc.), but are preferably attached to the edges 403 of the panel pivotally, so objects can be loaded into the bed extension while the side panels 402 are open—pivoted outwardly. If the side panels 402 are pivotally attached to the rear panel 104, locking means (not shown) are provided to lock the panels when closed—pivoted in a position parallel to the sides of the truck.

Handles 404 are attached to the rear panel 104 to allow the user to pull the bed extension/ramp 100 into its ramp mode (FIG. 3) and push it into its bed extension mode (FIG. 1). Different types of handles can be used and they can be attached at different locations; however, for physical ease, they are preferably attached as shown in the attached figures. Alternatively, the rear panel 104 could define openings close to its upper edge when in the upright position (or close to the tip of the side tongues 102 if it comprises a cavity 101), which could be used as handles.

Other embodiments and uses of the invention will be apparent to those skilled in the art from consideration of the specification and practice of the invention disclosed herein. The specification and examples should be considered exemplary only and do not limit the intended scope of the invention.

What is claimed is:

1. A combination bed extension/ramp structure for attachment to a sleeve-hitch of a truck having a bed, the structure comprising:
   a non-revolving-hitch attachment member;
   a rear panel pivotally connected to the non-revolving-hitch attachment member to pivot around a first substantially horizontal axis from a first substantially upright position to a second position, wherein the rear panel is acting as a ramp between a rear panel-ground contact point and the plane of the non-revolving-hitch attachment member;

a front substantially rectangular panel pivotally connected to the rear panel at an intermediate point whereby when the rear panel is in the first position, the front panel is positioned substantially horizontal and at a level suitable to form an extension to said bed;

whereby when the rear panel pivots from the first position to the second position, the front panel automatically pivots relative to the rear panel around a second substantially horizontal axis and moves from the horizontal position to an inclined position that complements the inclination of the rear panel in the second position; and whereby the structure can be converted between a bed extension mode and a ramp mode while attached to said truck.

2. The structure of claim 1 further comprising locking means to lock and unlock the rear panel in the first position.

3. The structure of claim 1 further comprising two side panels, each attached to a side edge of the rear panel.

4. The structure of claim 3, whereby the two side panels are pivotally attached to the side edges of the rear panel.

5. The structure of claim 2 further comprising a hitch-ball operatively attached to the rear panel for towing when the rear panel is locked in the first position.

6. The structure of claim 1, wherein the rear panel comprises a handle for pulling the rear panel into the second position and pushing the rear panel into the first position.

7. The structure of claim 1, wherein the rear panel comprises two side tongues that define a twin ramp when the rear panel is in the second position.

8. The structure of claim 7, wherein the rear panel comprises an auxiliary panel pivotally connected to it between the two side tongues to pivot around a third substantially horizontal axis from a closed position, wherein the auxiliary panel is substantially planarly parallel to the rear panel, to an open position, wherein the auxiliary panel is acting as an auxiliary ramp.

* * * * *